(12) United States Patent
Armacanqui et al.

(10) Patent No.: US 11,670,823 B2
(45) Date of Patent: ***Jun. 6, 2023

(54) SEPARATOR FOR ALKALINE CELLS

(71) Applicant: Energizer Brands, LLC, St. Louis, MO (US)

(72) Inventors: M. Edgar Armacanqui, Middleton, WI (US); Andrew J. Roszkowski, Middleton, WI (US); Donald Raymond Crowe, Middleton, WI (US); Enqing Zhu, St. Louis, MO (US); John L. Hadley, Madison, WI (US); Matthew Hennek, Stoughton, WI (US); Tim F. Turba, St. Louis, MO (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/646,469

(22) PCT Filed: Sep. 14, 2018

(86) PCT No.: PCT/US2018/051095
§ 371 (c)(1),
(2) Date: Mar. 11, 2020

(87) PCT Pub. No.: WO2019/055792
PCT Pub. Date: Mar. 21, 2019

(65) Prior Publication Data
US 2020/0295330 A1    Sep. 17, 2020

Related U.S. Application Data

(60) Provisional application No. 62/559,385, filed on Sep. 15, 2017.

(51) Int. Cl.
*H01M 50/44* (2021.01)
*H01M 50/414* (2021.01)
(Continued)

(52) U.S. Cl.
CPC .......... *H01M 50/44* (2021.01); *H01M 4/244* (2013.01); *H01M 4/42* (2013.01); *H01M 50/414* (2021.01);
(Continued)

(58) Field of Classification Search
CPC ....... H01M 4/42; H01M 4/244; H01M 50/411
See application file for complete search history.

(56) References Cited

U.S. PATENT DOCUMENTS 10,804,517 B2    10/2020 Ogawa et al.
2001/0038946 A1*   11/2001 Rao .................... H01M 50/414
429/251

(Continued)

FOREIGN PATENT DOCUMENTS

EP    1737004 A1    12/2006
EP    2077593 A1    7/2009
(Continued)

OTHER PUBLICATIONS

International Searching Authority, International Search Report and Written Opinion for International Application No. PCT/US2018/051095, dated Sep. 14, 2018, (14 pages), U.S. Patent and Trademark Office, Alexandria, Virginia.
(Continued)

*Primary Examiner* — Kenneth J Douyette
(74) *Attorney, Agent, or Firm* — Alston & Bird LLP (57) ABSTRACT

An alkaline electrochemical cell includes a cathode; a gelled anode having an anode active material and an electrolyte; and a separator disposed between the cathode and the anode; wherein the separator includes a non-conductive, porous
(Continued)

material having a mean pore size of about 1 micron to about 5 microns, a maximum pore size of about 19 microns, and an air permeability of about 0.5 cc/cm$^2$/s to about 3.8 cc/cm$^2$/s at 125 Pa.

9 Claims, 8 Drawing Sheets

(51) Int. Cl.
  *H01M 50/489* (2021.01)
  *H01M 4/24* (2006.01)
  *H01M 4/42* (2006.01)
  *H01M 4/02* (2006.01)

(52) U.S. Cl.
  CPC .... *H01M 50/489* (2021.01); *H01M 2004/021* (2013.01); *H01M 2004/023* (2013.01); *H01M 2004/027* (2013.01); *H01M 2300/0014* (2013.01)

(56) References Cited

U.S. PATENT DOCUMENTS

| | | |
|---|---|---|
| 2002/0164530 A1 | 11/2002 | Iwakura et al. |
| 2003/0096171 A1* | 5/2003 | Thrasher ............... H01M 50/44 429/247 |
| 2003/0129379 A1* | 7/2003 | Yao ..................... H01M 50/494 428/315.7 |
| 2006/0194100 A1 | 8/2006 | Tanaka et al. |
| 2006/0257728 A1 | 11/2006 | Mortensen et al. |
| 2007/0184340 A1* | 8/2007 | Ichikawa ............... H01M 50/46 29/623.1 |
| 2007/0232175 A1* | 10/2007 | Katayama ................. D01F 8/12 442/364 |
| 2007/0287062 A1* | 12/2007 | Tsukuda .............. H01M 50/403 429/129 |
| 2014/0134498 A1 | 5/2014 | Lim et al. |
| 2015/0037627 A1 | 2/2015 | Armacanqui et al. |
| 2017/0098865 A9 | 4/2017 | Issaev et al. |
| 2020/0350541 A1 | 11/2020 | Derrien |

FOREIGN PATENT DOCUMENTS

| | | |
|---|---|---|
| WO | WO 02/068746 A2 | 9/2002 |
| WO | WO 03/043103 A2 | 5/2003 |
| WO | WO-2016/183373 A1 | 11/2016 |

OTHER PUBLICATIONS

European Patent Office, Extended European Search Report received for Application No. 18855678.1, dated Jun. 30, 2021, 9 pages, Germany.

* cited by examiner

SEPARATOR FOR ALKALINE CELLS

CROSS-REFERENCE TO RELATED APPLICATIONS

This application is a National Stage Application, filed under 35 U.S.C. § 371, of International Application No. PCT/US2018/051095, filed Sep. 14, 2018, which claims priority to U.S. Provisional Patent Application No. 62/559,385, filed on Sep. 15, 2017, the contents of both of which is incorporated herein by reference in their entirety for any and all purposes.

FIELD

The present technology is generally related to the field of electrochemical cells. In particular, the technology is related to separators for electrochemical cells, the separators exhibiting improved pore size and air permeability.

BACKGROUND

Conventional alkaline cells typically employ a non-woven separator sheet as the separator. The sheet is typically wound, or wrapped, upon itself to form a cylindrical shape that is then disposed between the anode and cathode electrode materials, the anode material being contained within the separator. Many times, the winding, or wrapping, is done multiple times to ensure sufficient and efficient separation between the electrodes (i.e. that there is sufficient overlap to ensure leakage and shorting between the anode and cathode is prevented). As an illustration, where the wrapping is done with three integral wraps, it may be referred to as having a 1×3 separator wrapping arrangement, i.e. a single sheet rolled/wrapped upon itself in a roll fashion, three times. This arrangement typically results in a thick separator which occupies significant volume in the cell, thereby resulting in a substantial decrease in the available volume needed for active ingredients, such as zinc anode particles. This is especially true for smaller cells like LR06 or LR03 cells, where the outer dimensions of the cell are standardized and cannot be changed. Various embodiments are directed to improving the performance of alkaline electrochemical cells.

BRIEF SUMMARY

In one aspect, an alkaline electrochemical cell separator is provided which includes a non-conductive, porous material, wherein the separator has a mean pore size of about 1 micron to about 6 microns, and an air permeability of about 0.5 cc/cm$^2$/s to about 3.8 cc/cm$^2$/s at 125 Pa.

In another aspect, an alkaline electrochemical cell is provided which includes a cathode; a gelled anode comprising an anode active material and an electrolyte; and a separator disposed between the cathode and the anode; wherein the separator comprises a non-conductive, porous material having a maximum pore size of 1 about 19 microns, and an air permeability of about 0.5 cc/cm$^2$/s to about 3.8 cc/cm$^2$/s at 125 Pa.

In various embodiments that are combinable with the above aspects and embodiments, the non-conductive, porous material comprises an ion-permeable, non-woven sheet (barrier). In some embodiments that are combinable with the above aspects and embodiments, the separator has an air permeability of from about 500 cc/cm$^2$/min to about 3000 cc/cm$^2$/min, at 1 KPa. In some embodiments that are combinable with the above aspects and embodiments, the separator has a mean pore size of about 0.5 micron to about 3.8 microns. In some embodiments that are combinable with the above aspects and embodiments, the separator has a basis weight of about 20 g/m$^2$ to about 32 g/m$^2$. In some embodiments that are combinable with the above aspects and embodiments, the separator has a dry thickness of from about 60 microns to about 120 microns. In some embodiments that are combinable with the above aspects and embodiments, the separator is permeable to hydroxide ions and water. In some embodiments that are combinable with the above aspects and embodiments, the separator has a single layer of non-conductive, porous material wound twice.

In various embodiments that are combinable with the above aspects and embodiments for the electrochemical cell, about 10% to about 60% by weight of the anode active material relative to the total amount of anode active material has a particle size of less than about 75 microns, about 5% to about 30% by weight relative of the total zinc alloy has a particle size of greater than about 150 micrometers, and less than about 10% by weight of the anode active material relative to the total amount of anode active material has a particle size of less than about 45 microns. In some embodiments that are combinable with the above aspects and embodiments, the anode active material has an apparent density from about 2.40 g/cc to about 3.40 g/cc. In some embodiments that are combinable with the above aspects and embodiments, the electrolyte has a hydroxide concentration of about 24 wt % to about 36 wt %. In some embodiments that are combinable with the above aspects and embodiments, the anode active material includes a zinc alloy. In some embodiments that are combinable with the above aspects and embodiments, the zinc alloy includes zinc, indium, and/or bismuth, and/or lead. In other embodiments, the zinc alloy includes about 100 ppm to about 300 ppm of bismuth, and/or about 100 ppm to about 300 ppm of indium, and/or about 50 to 500 ppm of lead. In some embodiments that are combinable with the above aspects and embodiments, the anode includes from about 62% to about 72% by weight of the zinc alloy, relative to the total weight of the anode.

It is to be further noted that the design or configuration of the components presented in these figures are not scale, and/or are intended for purposes of illustration only. Accordingly, the design or configuration of the components may be other than herein described without departing from the intended scope of the present disclosure. These figures should therefore not be viewed in a limiting sense.

DETAILED DESCRIPTION OF VARIOUS EMBODIMENTS

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Ratio, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

As used herein, the term "zinc anode" refers to an anode that includes zinc as an anode active material.

As used herein, "fines" are particles passing through a standard 200 mesh screen in a normal sieving operation (i.e., with the sieve shaken by hand). "Dust" consists of particles passing through a standard 325 mesh screen in a normal sieving operation. "Coarse" consists of particles not passing through a standard 100 mesh screen in a normal sieving operation. Mesh sizes and corresponding particle sizes as described here apply to a standard test method for sieve analysis of metal powders which is described in ASTM B214. Typically, fines comprise particles smaller than 75 microns, coarse comprises particles greater than 150 microns, and dust comprises particles smaller than 45 microns.

As used herein, "aspect ratio" refers to the dimension determined by the ratio between the length of the longest dimension of the particle and the relative width of the particle.

As used herein, the term "ppm" means parts per million by weight, unless explicitly expressed otherwise.

As used herein, the term "air permeability" denotes the volume of air allowed to flow per an area of the separator.

The present disclosure is directed to improving the performance of cells, such as alkaline cells. The disclosure is also direct toward suppressing undesirable reactions at the separator-electrode interface that can lead to anode to cathode electrical shorting.

Alkaline electrochemical cells are equipped with a separator to physically separate the anode and cathode and prevent any electronic current passing through them. Additionally, the separator functions to permit the passage of ionic current with minimum hindrance and keep the zinc surface properly wetted by the electrolyte. Ideally, the separator should have a uniform dry thickness and uniform pore size distribution. It has now been found that the number of separator wraps in electrochemical cells may be reduced by providing a separator with improved properties such as pore size and air permeability.

In one aspect, an alkaline electrochemical cell is provided. The cells may include a cathode, an anode which includes an anode active material and an electrolyte, and a separator disposed between the cathode and the anode. In another aspect, an alkaline electrochemical cell separator includes a porous material of desired pore size and air permeability to allow for a reduced number of separator wraps within the electrochemical cell, as compared to convention cell constructions.

The separator may be made of any suitable alkaline resistant, ion-permeable, non-conductive, synthetic or natural, woven or non-woven porous material, including, but not limited to, polymer materials, Tencel® (lyocell), mercerized wood pulp, polypropylene, polyethylene, cellophane, cellulose, methylcellulose, rayon, nylon and combinations thereof. In some embodiments, the non-conductive, porous material includes an ion-permeable, non-woven sheet (barrier). In some embodiments, the separator is composed of a porous material which includes a paper composed of one or more polymeric fibers. The separator may be made of a porous material which includes one or more polymeric fibers with an effective amount of a surface active agent embedded therein. Suitable polymeric materials for the polymeric fibers include, but are not limited to, polyvinyl alcohol, polyamides, polyethylene terephthalate, polypropylene terephthalate, polybutylene terephthalate, polyvinylidene fluoride, polyacrylonitrile, polypropylene, polyethylene, polyurethane and blends, mixtures and copolymers thereof. Illustrative polymeric fibers may include, but are not limited to, materials such as rayon, nylon, and the like, and combinations of any two or more thereof. In some embodiments, the separator includes a non-woven material formed from alkaline resistant fibers. In some embodiments, the separator includes a non-woven paper. In some embodiments, the non-conductive, porous material includes polyvinyl alcohol and rayon fibers.

In various embodiments, the separator may have a maximum pore size equal to or less than about 25 microns. This includes a maximum pore size of about 24 microns, about 22 microns, about 18 microns, about 15 microns, about 10 microns or about 8 microns. In some embodiments, the separator has a maximum pore size of about 22 microns. In other embodiments, the separator has a maximum pore size of about 19 microns. In some embodiments, the separator has a mean pore size, when measured with a PMI capillary flow porometer, of from about 0.01 micron to about 25 microns, about 0.1 micron to about 20 microns, about 0.5 micron to about 15 microns, about 1 micron to about 10 microns, about 2 microns to about 8 microns, or about 3 microns to about 5 microns, and ranges between any two of these values or less than any one of these values. In some embodiments, the separator has a mean pore size, when measured with a PMI capillary flow porometer, of from about 1 micron to about 6 microns. In other embodiments, the separator has a mean pore size, when measured with a PMI capillary flow porometer, of from about 2 microns to about 5 microns. In some embodiments, the separator has a maximum pore size of from about 1 micron to about 6 microns. In other embodiments, the separator has a mean pore size of from about 2 microns to about 5 microns.

In various embodiments, the separator may have air permeability in the range from about 0.1 cc/cm$^2$/s (cubic centimeter per centimeter square per second) to about 20 cc/cm$^2$/s when measured at 125 Pascal (Pa) pressure. This includes from about 0.01 cc/cm$^2$/s to about 20 cc/cm$^2$/s, about 0.1 cc/cm$^2$/s to about 15 cc/cm$^2$/s, about 0.5 cc/cm$^2$/s to about 10 cc/cm$^2$/s, about 0.5 cc/cm$^2$/s to about 8 cc/cm$^2$/s, about 0.5 cc/cm$^2$/s to about 6 cc/cm$^2$/s, about 0.5 cc/cm$^2$/s to about 4 cc/cm$^2$/s, or about 0.5 cc/cm$^2$/s to about 3 cc/cm$^2$/s, at 125 Pa, and ranges between any two of these values or less than any one of these values. In some embodiments, the separator has air permeability of from about 0.5 cc/cm$^2$/s to about 4 cc/cm$^2$/s, at 125 Pa. In some embodiments, the separator has air permeability of from about 0.5 cc/cm$^2$/s to about 3.8 cc/cm$^2$/s, at 125 Pa.

In various embodiments, the separator may have air permeability in the range from about 50 cc/cm$^2$/min (cubic centimeter per centimeter square per minute) to about 30,000 cc/cm$^2$/s when measured at 1 Kilopascal (KPa) pressure. This includes air permeability of from about 100 cc/cm$^2$/min to about 10,000 cc/cm$^2$/min, about 200 cc/cm$^2$/min to about 8000 cc/cm$^2$/min, about 300 cc/cm$^2$/min to about 5000 cc/cm$^2$/min, about 500 cc/cm$^2$/min to about 3000 cc/cm$^2$/min, about 600 cc/cm$^2$/min to about 2500 cc/cm$^2$/min, about 700 cc/cm$^2$/min to about 2000 cc/cm$^2$/min, or about 800 cc/cm$^2$/min to about 1000 cc/cm$^2$/min, at 1 KPa, and ranges between any two of these values or less than any one of these values. In some embodiments, the separator has an air permeability of from about 500 cc/cm$^2$/min to about 3000 cc/cm$^2$/min, at 1 KPa. In some embodiments, the separator has an air permeability of from about 240 cc/cm$^2$/min to about 1824 cc/cm$^2$/min, at 1 KPa.

In various embodiments, the separator may have a desired basis weight ranging from about 1 g/m$^2$ to about 100 g/m$^2$. This includes a desired basis weight of from about 1 g/m$^2$ to about 90 g/m$^2$, about 1 g/m$^2$ to about 80 g/m$^2$, about 5 g/m$^2$ to about 70 g/m$^2$, about 10 g/m$^2$ to about 50 g/m$^2$, about 20 g/m$^2$ to about 32 g/m$^2$, about 22 g/m$^2$ to about 30 g/m$^2$, or about 23 g/m$^2$ to about 28 g/m$^2$, and ranges between any two of these values or less than any one of these values. In some embodiments, the separator has a desired basis weight of from about 20 g/m$^2$ to about 32 g/m$^2$. In other embodiments, the separator has a desired basis weight of from about 24 g/m$^2$ to about 30 g/m$^2$.

Superior high rate performance is provided by an electrochemical cell when there is a rapid, preferential transport of the electrolyte through the separator. Accordingly, the separator is designed to be thin as possible, in order to maximize the rate of discharge. In various embodiments, the separator may have a dry thickness ranging from about 10 microns to about 200 microns. This includes a dry thickness of from about 20 microns to about 150 microns, about 40 microns to about 175 microns, about 60 micron to about 120 microns, about 70 microns to about 100 microns, about 75 microns to about 95 microns, or about 80 microns to about 90 microns, and ranges between any two of these values or less than any one of these values. In some embodiments, the separator has a dry thickness of from about 60 microns to about 120 microns. In other embodiments, the separator has a dry thickness of from about 75 microns to about 95 microns.

In one aspect, provided is a separator, and/or an electrochemical cell comprising such a separator, which includes a non-conductive, porous material having a maximum pore size of about 19 microns. In one aspect, provided is a separator, and/or an electrochemical cell comprising such a separator, which includes a non-conductive, porous material having a mean pore size of about 1 micron to about 6 microns. In another aspect, provided is a separator, and/or an electrochemical cell comprising such a separator, which includes a non-conductive, porous material having an air permeability of about 0.5 cc/cm$^2$/s to about 3.8 cc/cm$^2$/s at 125 Pa. In yet another aspect, provided is a separator, and/or an electrochemical cell comprising such a separator, which includes a non-conductive, porous material having an air permeability of from about 500 cc/cm$^2$/min to about 3000 cc/cm$^2$/min, at 1 KPa. In another aspect, provided is a separator, and/or an electrochemical cell comprising such a separator, which includes a non-conductive, porous material having a basis weight of about 20 g/m$^2$ to about 32 g/m$^2$. In yet another aspect, provided is a separator, and/or an electrochemical cell comprising such a separator, which includes a non-conductive, porous material having a dry thickness of from about 60 microns to about 120 microns. Each of these aspects is combinable with the other aspects and embodiments.

In various embodiments, the separator described herein is referred to as "Paper 1." Generally, the number of wraps of the separator material used in the electrochemical cell may be optimized for a given application and/or to achieve a desired performance within the cell. The separator disclosed herein allows the use of less than 3 wraps of the paper. In some embodiments, the Paper 1 separator may be designed to include a single layer of the non-conductive, porous material sheet wound twice. In various embodiments, the separator includes greater than about 1 and less than about 4, greater than about 1.1 and less than about 3, greater than about 1.2 and less than about 2, or greater than about 1.3 and less than about 1.8 (wherein a wrap number of greater than 1 indicates some degree of overlap of the separator is present within the cell). In some embodiments, the separator includes less than about 2 wraps of the non-conductive, porous material. In some embodiments, the separator includes less than about 3 wraps of the non-conductive, porous material. In other embodiments, the number of wraps is greater than about 3 and less than about 4. It should be noted that the number of "wraps" for a wound separator configuration indicates the number of windings of the separator, which may itself be multi-layer or single layer. For example, a 1×2 wrap indicates that the separator has 2 wraps of a single layer separator. In some embodiments, the separator may be designed to include a single layer of the non-conductive, porous material sheet wound twice.

The separator described herein has several advantages with regard to pore size to prevent short-circuiting resulting from the transport of active materials, improved mechanical strength and electrolyte permeability, low electrical resistance, sufficient pliability, high chemical resistance, and high thermal stability. Without being held to any particular theory, it is generally believed that the separator disclosed herein is advantageous because it occupies or consumes less volume, as compared to a conventional separator, thus decreasing the total separator dry thickness and making space for added amount of active ingredients such as that of anode or cathode electrodes.

Further, the separator acts to improve shorting resistance, given that a barrier with small pore size provides internal shorting resistance that would not be possible with the conventional separators not having the characteristics described herein.

The performance of the electrochemical cell including the separator of the present technology can be further enhanced with the use of improved zinc anode material, relative to that of cells made with conventional zinc anode material. Accordingly, in various embodiments, the separator of the present technology is used in conjunction with the anode which includes high fines (HF) anode active materials, where the fines content is higher and the coarse content is lower than that of conventional standard zinc powders. In various embodiments, the anode active material may have a particle size distribution of less than about 15 wt % dust, about 10 wt % to about 70 wt % fines and about 5 wt % to about 35 wt % coarse particles. In some embodiments, the anode active material of the present technology has a particle size distribution of less than about 10 wt % dust, about 15 wt % to about 65 wt % fines and about 5 wt % to about 25 wt % coarse particles. A suitable zinc particle size distribution may be one in which about 25% to about 45% by weight of the anode active material, relative to the total amount of anode active material has a particle size of less than about 75 microns, about 5% to about 25% by weight relative of the total zinc alloy has a particle size of greater than about 150 micrometers, about less than 2% by weight of the total zinc alloy has a particle size greater than 425 microns, and less than 10% by weight of the anode active material, relative to the total amount of anode active material has a particle size of less than about 45 microns.

In some embodiments, the type of the anode active material used, having an optimized particle size distribution and apparent density, may be similar to that described in substantial detail in U.S. Patent Publication No. 2015/0037627, the complete disclosure of which is incorporated herein by reference. In other embodiments, the anode active material has an apparent density of from about 2.00 g/cc to about 4.15 g/cc, in some embodiments from about 2.25 g/cc to about 3.85 g/cc, in some embodiments about 2.50 g/cc to about 3.50 g/cc, in some embodiments about 2.60 g/cc to about 3.35 g/cc, and in some embodiments about 2.70 g/cc to about 3.15 g/cc.

Although the embodiments described herein generally relate to alkaline cells, they are applicable to other suitable electrochemical cells including, for example, alkaline cylindrical cells, e.g., metal-metal oxide cell, as well as galvanic cells, such as in metal-air cells, e.g., zinc-air cell. Among the cylindrical metal-metal oxide cells and metal-air cells, the anode material is applicable to those shaped for AA, AAA, AAAA, C, or D cells. These include, for example, alkaline cells LR03, LR6, LR8D425, LR14, LR20. The electrochemical cells have applications to non-cylindrical cells, such as flat cells (e.g., prismatic cells and button cells) and rounded flat cells (e.g., having a racetrack cross-section). Metal-air cells which include the anode described herein may usefully be constructed as button cells for the various applications such as hearing aid batteries, and in watches, clocks, timers, calculators, laser pointers, toys, and other novelties. Suitable electrochemical cells may also include any metal air cell using flat, bent, or cylindrical electrodes. Use of the anode as a component in other forms of electrochemical cells is also contemplated.

The anode of the electrochemical cell may be a gelled anode which includes, an anode active material, an alkaline electrolyte, a gelling agent, and optionally one or more surfactants as corrosion inhibitors. The gelled anode may include also other components or additives such as, for example, absorbents, inorganic gassing inhibitors, and additives to control electrical short circuit between the anode and cathode electrodes. The anode active material may include a zinc alloy which includes from about 20 ppm to about 750 ppm of one or more alloying element selected from, bismuth, indium, lead, and aluminum. In some embodiments, the zinc alloy includes bismuth and indium as main alloying elements, each at a concentration of about 150 ppm, 200 ppm, or 250 ppm. The anode includes high fines (HF) anode active materials, as described hereinabove, where the fines content is higher and coarse content is lower than that of conventional standard zinc powders.

The gelled anode may include an alkaline electrolyte, and in some embodiments an alkaline electrolyte having a relatively low hydroxide content. Suitable alkaline electrolytes include, for example, aqueous solutions of potassium hydroxide, sodium hydroxide, lithium hydroxide, as well as combinations of any two or more thereof. In one particular embodiment, however, a potassium hydroxide-containing electrolyte is used. In other embodiments, the alkaline electrolyte includes water and potassium hydroxide.

The electrolytes advantageously have a lower concentration of hydroxide ions in the electrolyte than those used in conventional cells. For example, the electrolyte may have a hydroxide (e.g., potassium hydroxide) concentration of less than about 36%, based on the total electrolyte weight. This includes a hydroxide concentration of less than about 35%, less than about 34%, less than about 32%, less than about 30%, less than about 29%, or less than about 28%, based on the total electrolyte weight. In various embodiments, the electrolyte has a hydroxide concentration of about 25% to about 34%, about 26% to about 34%, about 27% to about 34%, about 28% to about 34%, or about 28% to about 32%, and ranges between any two of these values or less than any one of these values. This includes a hydroxide concentration of about 35%, about 34%, about 32%, about 31%, about 30.5%, about 30%, about 29%, or about 28%, based on the total electrolyte weight. In an illustrative embodiment, the hydroxide concentration of the electrolyte is about 27% to about 31% by weight, based on the total weight of the electrolyte.

The anode may be prepared by formulating an electrolyte, preparing a coated metal anode, which includes the gelling agent, and then combining the electrolyte and the coated metal anode to form a gelled anode. The gelling agent of the present disclosure may include, for example, a highly cross-linked, polymeric chemical compound that has negatively charged acid groups, such as a polyacrylic acid gelling agent having a high degree of crosslinking.). Highly crosslinked polyacrylic acid gelling agents, are commercially available under the names Carbopol® (Carbopol® 940, Carbopol® 934, or Carbopol® 674) from Lubrizol Corporation (Wickliffe, Ohio), Flogel® (e.g., Flogel® 700 or Flogel® 800) from SNF Holding Company (Riceboro, Ga.), and Polygel® (e.g., Polygel® CK, or Polygel® CA) from 3V Sigma S.P.A. (Georgetown, S.C.), among others, are suitable for use in accordance with the present disclosure. The concentration of the gelling agent in the gelled anode may be from about 0.20 wt % to about 1.5 wt %, about 0.40 wt % to about 1.00 wt %, about 0.60 wt % to about 0.70 wt %, or about 0.625 wt % to about 0.675 wt %, relative to the total weight of the gelled anode.

The cathode of the electrochemical cell may include any cathode active material generally recognized in the art for use in alkaline electrochemical cells. The cathode active material may be amorphous or crystalline, or a mixture of amorphous and crystalline. For example, the cathode active material may include, or be selected from, an oxide of copper, an oxide of manganese as electrolytic, chemical, or natural type (e.g., EMD, CMD, NMD, or a mixture of any two or more thereof), an oxide of silver, and/or an oxide or hydroxide of nickel, as well as a mixture of two or more of these oxides or hydroxide. Suitable examples of positive electrode materials include, but are not limited to, $MnO_2$ (EMD, CMD, NMD, and mixtures thereof), NiO, NiOOH, $Cu(OH)_2$, cobalt oxide, $PbO_2$, AgO, $Ag_2O$, $Ag_2Cu_2O_3$, $CuAgO_2$, $CuMnO_2$, Cu $Mn_2O_4$, $Cu_2MnO_4$, $Cu_{3-x}Mn_xO_3$, $Cu_{1-x}Mn_xO_2$, $Cu_{2-x}Mn_xO_2$ (where x<2), $Cu_{3-x}Mn_xO_4$ (where x<3), $Cu_2Ag_2O_4$, or a combination of any two or more thereof.

An exemplary embodiment of an alkaline electrochemical cell is described in PCT Publication No. WO 2016/183373, the complete disclosure of which is incorporated herein by reference.

As further detailed elsewhere herein, the electrochemical cells of the present disclosure have been observed to exhibit improved performance characteristics, which may be measured or tested in accordance with several methods under the American National Standards Institute (ANSI). Results of various tests of cells of the present disclosure are detailed below in the Examples.

The following Examples describe various embodiments of the present disclosure. Other embodiments within the scope of the appended claims will be apparent to one of ordinary skill in the art considering the specification or practice of the disclosure provided herein. It is therefore intended that the specification, together with the Examples, be considered exemplary only, with the scope and spirit of the disclosure being indicated by the claims, which follow the Examples.

EXAMPLES

In the Examples presented below, electrochemical cells including the separators of the present technology were tested for DSC performance, partial discharge cell gassing, undischarged cell gassing, and conditions after storage.

General.

Characterization. Air permeability of the separators was determined by using a PMI Capillary Flow Porometer and is reported in $cc/cm^2/s$ or $cc/cm^2/min$. Basis Weight of the separators was determined by ISO 536 (2012), which is hereby incorporated by reference and is reported in $g/m^2$. Dry thickness of the separators was determined by with a Mitutoyo Absolute Gauge using a flat probe of 10 mm diameter with low measuring force, and is reported in microns. Pore size was determined by PMI Capillary Flow Porometer and is reported in microns.

Example 1

Preparation of LR6 cells. Control cells having a conventional 1×3 separator were prepared. The conventional separator has a mean pore size of 9 micron, a maximum pore size of 32 microns as measured with a PMI capillary flow porometer, an air permeability of 22.1 $cc/cm^2/s$ at 125 Pa, a basis weight of 23 $g/m^2$ and a dry thickness of 80 microns.

Cells were also prepared using a 1×2 wrap of a non-woven paper (Paper 1) having a mean pore size of 1-6 microns as measured with a PMI capillary flow porometer, an air permeability of 1-4 $cc/cm^2/s$ at 125 Pa, a desired basis weight of 20-32 $g/m^2$ and a dry thickness of 60-120 microns.

Example 2

Electrochemical cells may be tested in accordance with methods under the American National Standards Institute (ANSI). For example, the ANSI data plotted in the figures correspond to testing done according to ANSI C18.1M, Part 2-2011, which is hereby incorporated by reference. These tests include determining cell performance/longevity under various discharge modes including cell pulse discharge, intermittent cell discharge, high temperature (HT) storage performance or Digital Still Camera (DSC), among other tests. Tests also include determining cell performance/longevity by discharging them in various devices such as portable lighting, CD-games, digital audio, and remote-radio-clock, toys, and Heavy Industrial Flashlight (HIFT). The results of various tests of cells of the present disclosure are detailed below.

Figure 1:
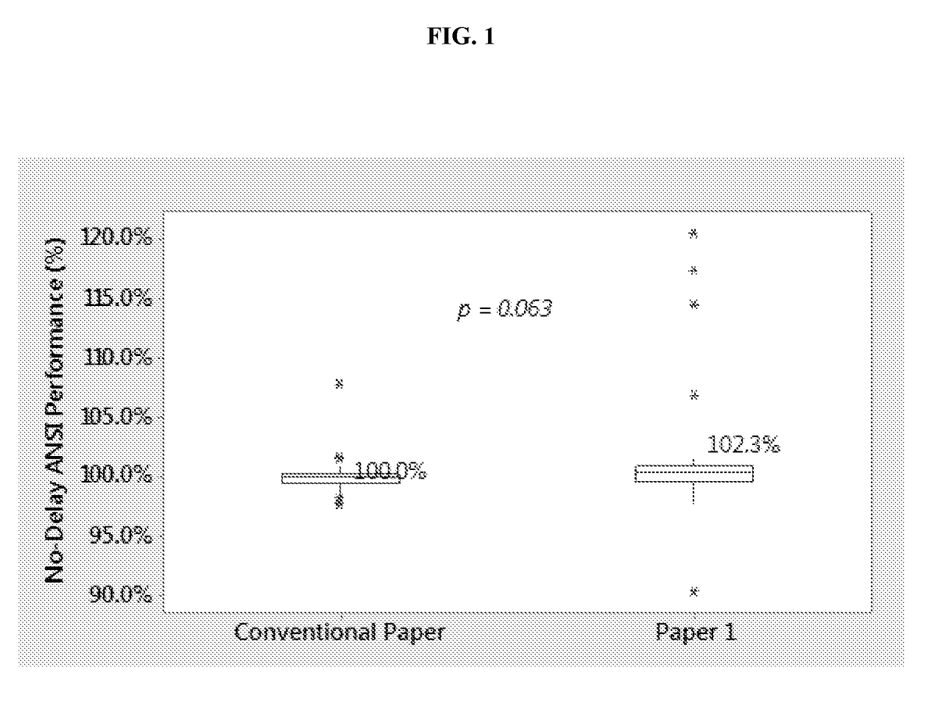
FIG. 1 illustrates an interaction plot for no-delay ANSI performance for a LR6 cell including a separator in accordance with the present disclosure.
Figure 2:
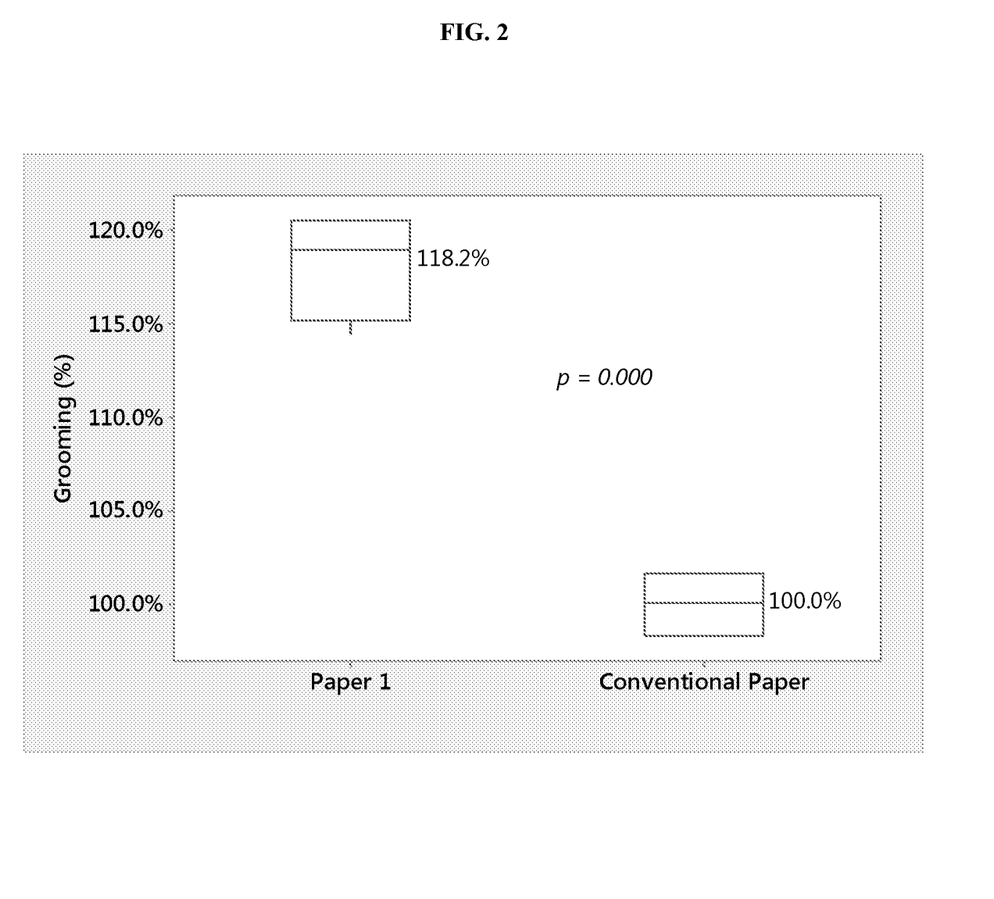
FIG. 2 is a graph illustrating grooming performance for a LR6 cell including a separator in accordance with the present disclosure.

FIG. 1 shows the average ANSI discharge performance of LR6 alkaline cells made with conventional zinc anode (without higher level of fines) and conventional separator at a zinc loading of 68%. It was observed that the average ANSI of seven tests for the Paper 1 separator of the present technology is improved by about 2.3% compared to the conventional separator. The most improved test was personal grooming (750 mA, 2 minute (min)/hour (hr), 8 hr/day), which improved by about 18.2%, as seen in FIG. 2. Further, the Toy test (3.9 ohms (Ω), 1 hr/day), was improved by 0.7%. No statistical performance impact was observed among the other tests including DSC (digital still camera, 1500 mW 2 seconds (s), 650 mW 28 s 5, min/hr), portable lighting (3.9 n, 4 min/hr, 8 hr/day), CD-games (250 mA, 1 hr/day), digital audio (100 mA, 1 hr/day), and remote-radio-clock (50 mA, 1 hr/12 hr, 24 hr) tests.

Figure 3:
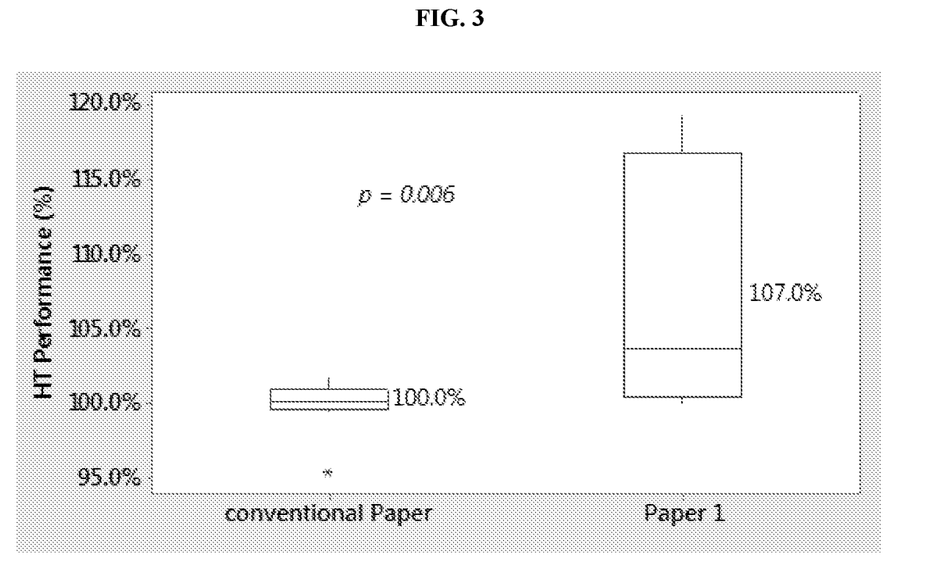
FIG. 3 is a graph illustrating high temperature performance of toy test after 1-week storage at 160° F., and of game test after 2-weeks of storage at 130° F., for a LR6 cell including a separator in accordance with the present disclosure.
Figure 4:
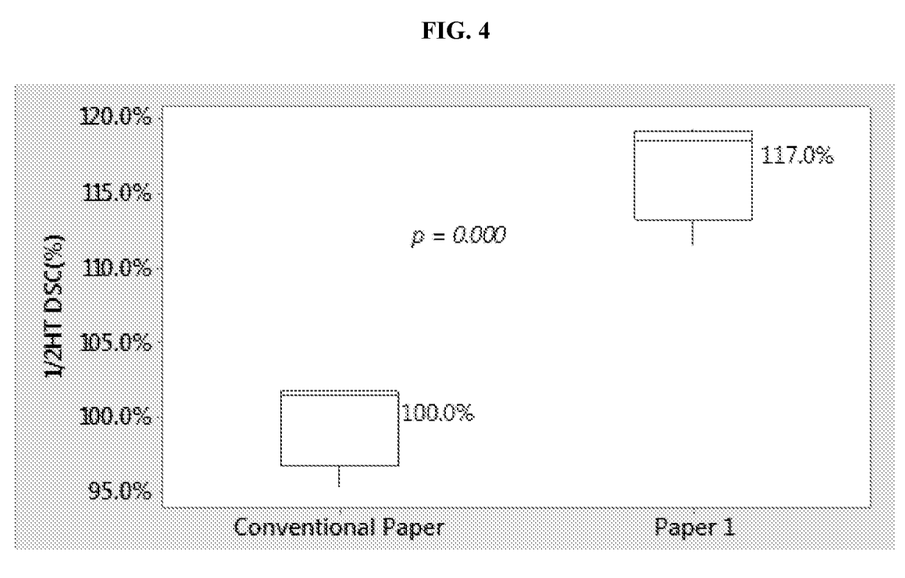
FIG. 4 is a graph illustrating LR6 cell high temperature performance of DSC tests after 2-weeks of storage at 130° F.

The performance gains with a separator of 1×2 Paper 1 was confirmed after storing the cells at high temperature (HT). FIG. 3 shows the LR6 average HT performance of toy test after 1-week storage at 71° C. (160° F.), (1 HT), and of Game and DSC tests both after 2-weeks of storage at 54.4° C. (130° F.) (½ HT). It is seen from FIG. 3 that cells made with 1×2 Paper 1 exhibit a net gain of 7% over conventional cells made with 1×3 standard separator paper. The main gain after HT storage was in the DSC test, amounting to 17%, as shown in FIG. 4. The discharge performance gains with the 1×2 separator arrangement can be maximized by increasing the zinc loading above 68%.

Figure 5:
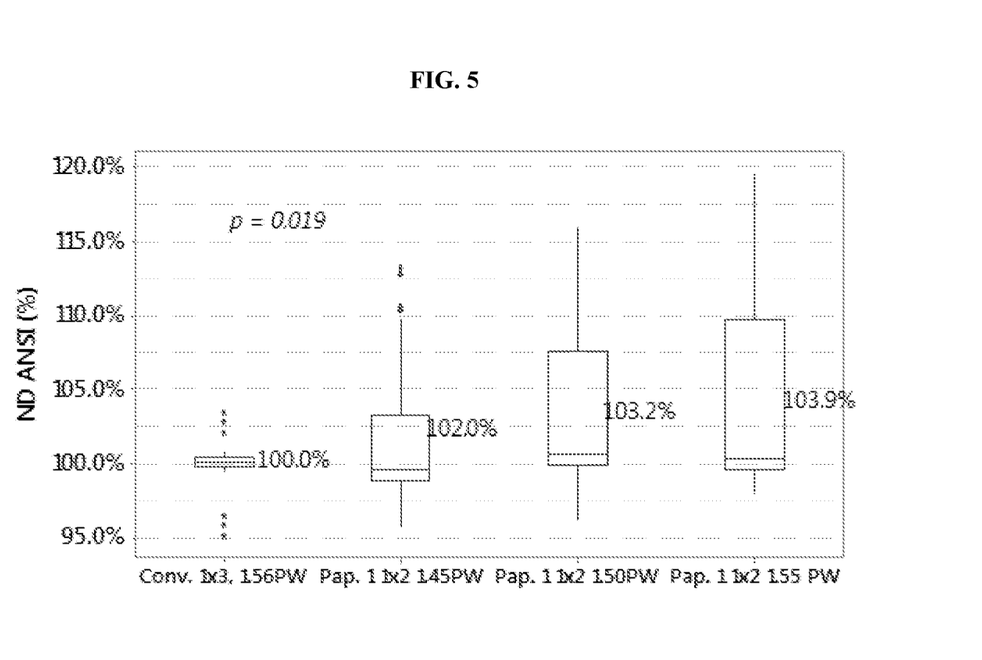
FIG. 5 illustrates an interaction plot for no-delay ANSI performance comparison of LR6 cells including a separator in accordance with the present disclosure.

FIG. 5 displays the no-delay ANSI average performance of LR6 cells made with 1×2 Paper 1 with pre-wet (PW) levels of KOH solution at 1.45 gram (g), 1.50 g, and 1.55 g, relative to the data of reference cells made with conventional 1×3 separator paper. The cells used HF zinc at 70% zinc loading. The average ANSI of cells made with HF zinc and 1×2 Paper 1 wrapping improved by 2% to 4% relative to the cell made with HF zinc and conventional 1×3 wrapping separator.

Figure 6:
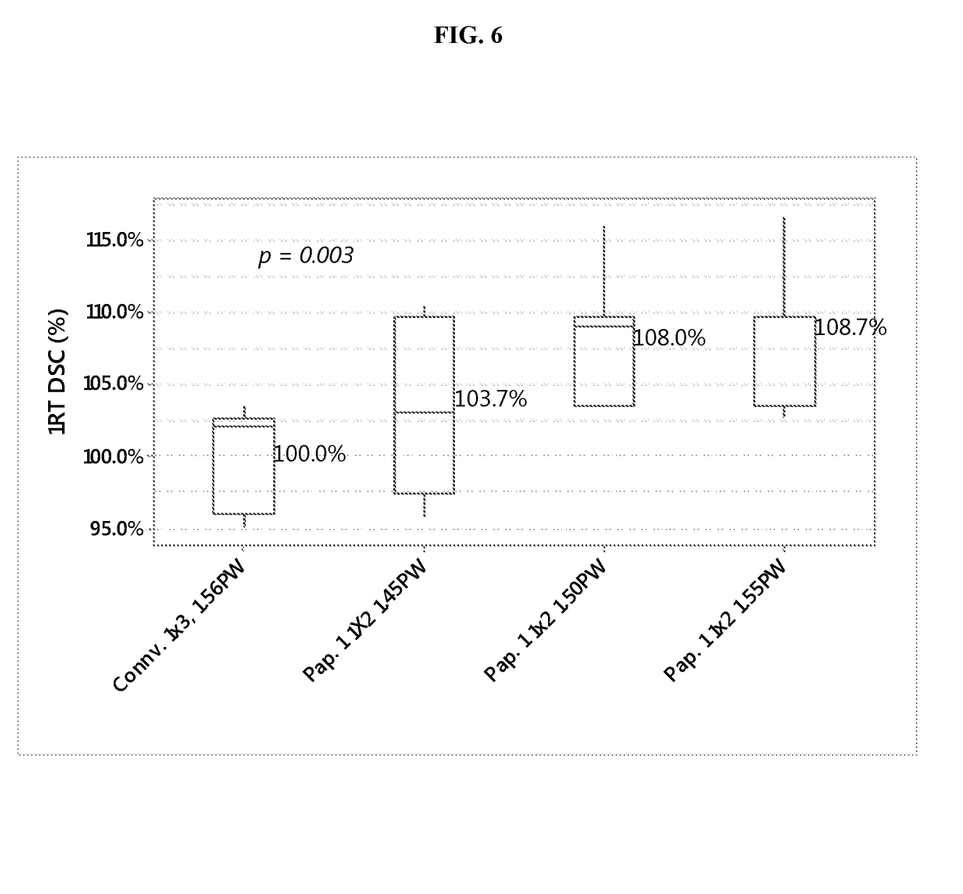
FIG. 6 is a graph illustrating the DSC performance of LR6 cells including a separator in accordance with the present disclosure.
Figure 7:
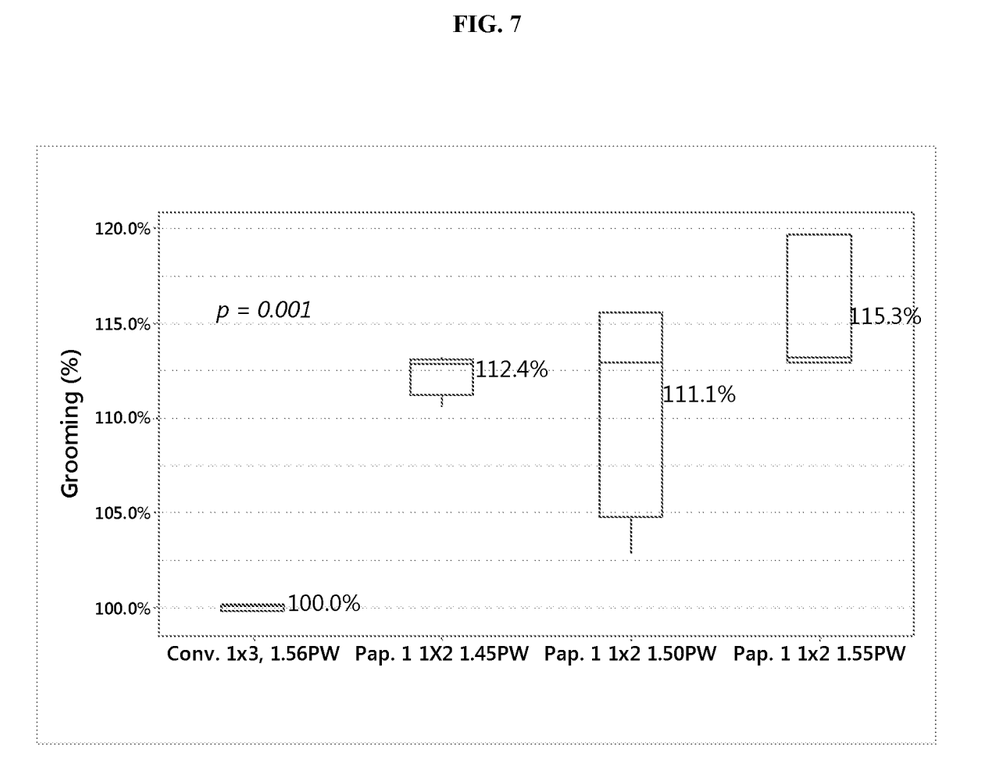
FIG. 7 is a graph illustrating the grooming performance for LR6 cells and whose performance is illustrated in FIG. 5 and FIG. 6.
Figure 8:
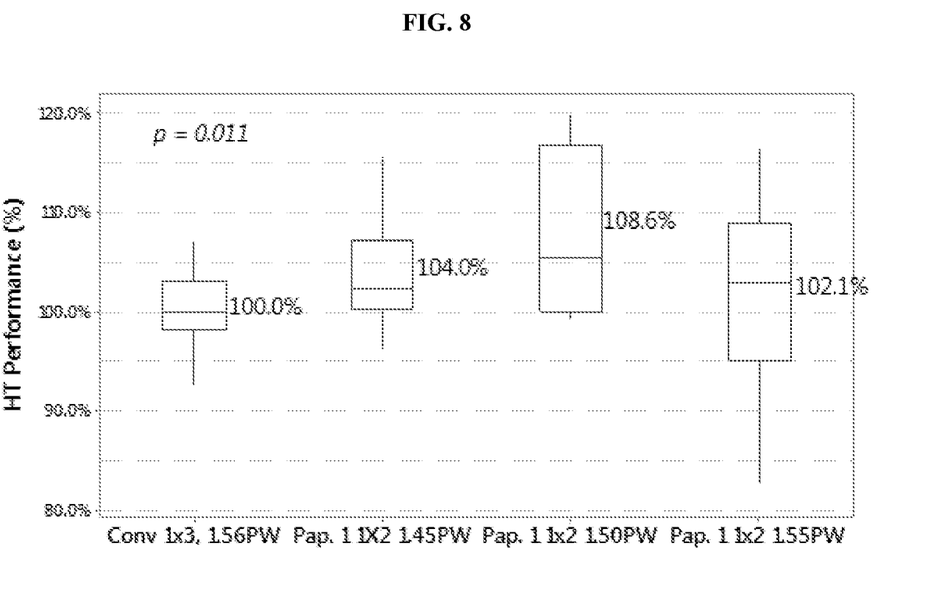
FIG. 8 is a graph illustrating the high temperature storage performance for LR6 cells and whose performance is illustrated in FIG. 5 and FIG. 6.

The DSC performance after one month storage (IRT) improved from 3% to 8% and personal grooming improved from 11% to 15%, relative to the cell made with HF zinc and conventional 1×3 paper wrapping separator, depending on the amount of pre-wet electrolyte, as shown in FIG. 6 and FIG. 7, respectively. The corresponding HT performance for LR6 cells made with HF zinc at 70% is illustrated in FIG. 8. The average gains ranging from 2.1% to 8.6% correspond to DSC and Toy tests after 1HT storage and to Game and DSC tests after ½ HT storage.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. An alkaline electrochemical cell comprising:
   a cathode;
   a gelled anode comprising an anode active material and an electrolyte; and
   a separator disposed between the cathode and the anode;
      wherein the separator comprises a non-conductive, porous material having a mean pore size of about 1 micron to about 5 microns, a maximum pore size of about 19 microns, and an air permeability of about 0.5 cc/cm$^2$/s to about 3.8 cc/cm$^2$/s at 125 Pa.

B. The alkaline electrochemical cell of Paragraph A, wherein the non-conductive, porous material is non-woven.

C. The alkaline electrochemical cell of Paragraph A or Paragraph B, wherein the non-conductive, porous material comprises polyvinyl alcohol.

D. The alkaline electrochemical cell of any one of Paragraphs A-C, wherein the separator has an air permeability of about 500 cc/cm$^2$/min to about 3000 cc/cm$^2$/min, at 1 KPa.

E. The alkaline electrochemical cell of any one of Paragraphs A-D, wherein the separator has a basis weight of about 20 g/m$^2$ to about 32 g/m$^2$.

F. The alkaline electrochemical cell of any one of Paragraphs A-E, wherein the separator has a dry thickness of about 60 microns to about 120 microns.

G. The alkaline electrochemical cell of any one of Paragraphs A-F, wherein the separator comprises less than 3 full wraps of the non-conductive, porous material.

H. The alkaline electrochemical cell of any one of Paragraphs A-G, wherein the anode active material comprises a zinc alloy.

I. The alkaline electrochemical cell of Paragraph H, wherein the zinc alloy comprises from about 130 ppm to about 270 ppm of bismuth and about 130 ppm to about 270 ppm of indium.

J. The alkaline electrochemical cell of any one of Paragraphs A-I, wherein about 20% to about 45% by weight of the anode active material relative to the total amount of anode active material has a particle size of less than about 75 microns, about 8% to about 25% by weight relative of the total zinc alloy has a particle size of greater than about 150 micrometers, and less than 10% by weight of the anode active material relative to the total amount of anode active material has a particle size of less than about 45 microns.

K. The alkaline electrochemical cell of any one of Paragraphs A-J, wherein the anode active material has an apparent density from about 2.50 g/cc to about 3.30 g/cc.

L. The alkaline electrochemical cell of any one of Paragraphs A-K, wherein the electrolyte has a hydroxide concentration of about 24 wt % to about 37 wt %.

M. An alkaline electrochemical cell separator comprising a non-conductive, porous material, wherein the separator has a mean pore size of about 1 micron to about 5 microns, a maximum pore size of about 19 microns, and an air permeability of about 0.5 $cc/cm^2/s$ to about 3.8 $cc/cm^2/s$ at 125 Pa.

N. The alkaline electrochemical cell separator of Paragraph M, wherein the non-conductive, porous material is non-woven.

O. The alkaline electrochemical cell separator of Paragraph M or Paragraph N, wherein the non-conductive, porous material comprises polyvinyl alcohol.

P. The alkaline electrochemical cell separator of any one of Paragraphs M-O, wherein the separator has an air permeability of from about 500 $cc/cm^2/min$ to about 3000 $cc/cm^2/min$, at 1 KPa.

Q. The alkaline electrochemical cell separator of any one of Paragraphs M-P, wherein the separator has a basis weight of about 20 $g/m^2$ to about 32 $g/m^2$.

R. The alkaline electrochemical cell separator of any one of Paragraphs M-Q, wherein the separator has a dry thickness of from about 60 microns to about 120 microns.

S. The alkaline electrochemical cell separator of any one of Paragraphs M-R, wherein the separator is permeable to hydroxide ions and water.

Other embodiments are set forth in the following claims.

What is claimed is:

1. An alkaline electrochemical cell separator comprising a non-conductive, porous, fibrous, alkaline resistant material, wherein the separator has a mean pore size of about 0.5 micron to about 3.8 microns, a maximum pore size of about 19 microns, an air permeability of about 0.5 $cc/cm^2/s$ to about 3.8 $cc/cm^2/s$ at 125 Pa, and a dry thickness of about 20 microns to about 150 microns.

2. The alkaline electrochemical cell separator of claim 1, wherein the non-conductive, porous, fibrous material is non-woven.

3. The alkaline electrochemical cell separator of claim 2, wherein the non-conductive, porous, fibrous material comprises polyvinyl alcohol.

4. The alkaline electrochemical cell separator of claim 1, wherein the non-conductive, porous, fibrous material comprises polyvinyl alcohol.

5. The alkaline electrochemical cell separator of claim 1, wherein the separator has an air permeability of from about 500 $cc/cm^2/min$ to about 3000 $cc/cm^2/min$, at 1 KPa.

6. The alkaline electrochemical cell separator of claim 1, wherein the separator has a basis weight of about 20 $g/m^2$ to about 32 $g/m^2$.

7. The alkaline electrochemical cell separator of claim 1, wherein the separator has a dry thickness of from about 60 microns to about 120 microns.

8. The alkaline electrochemical cell separator of claim 1, wherein the separator is permeable to hydroxide ions and water.

9. An alkaline electrochemical cell separator comprising a non-conductive, porous, fibrous, alkaline resistant material, wherein the separator has a mean pore size of about 0.5 micron to about 3.8 microns, a maximum pore size of about 19 microns, and an air permeability of about 240 $cc/cm^2/min$ to about 1824 $cc/cm^2/min$, at 1 KPa.

* * * * *